April 5, 1955
K. KLINKHAMMER
2,705,743
ALL-RELAY SELECTOR WITH DOUBLE-FUNCTION RELAY CHAIN CIRCUIT ARRANGEMENT FOR RELAY SYSTEMS
Filed June 27, 1952
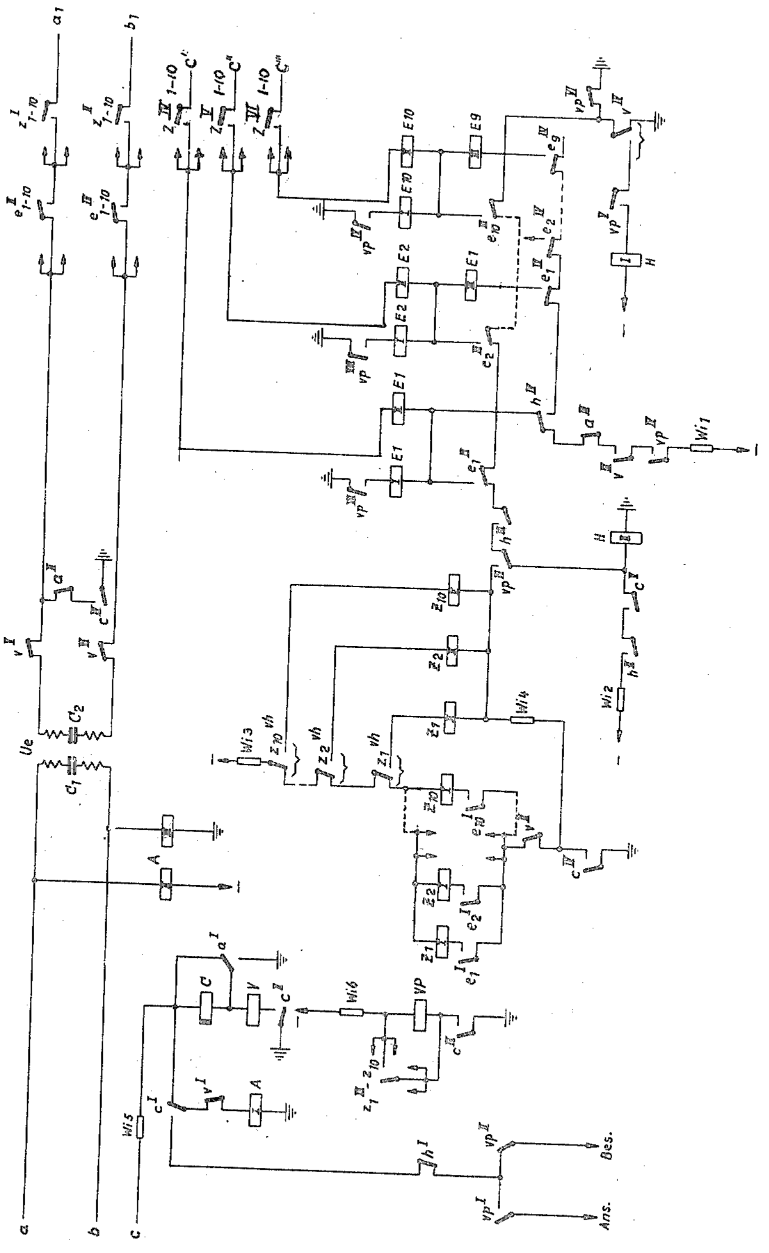
INVENTOR
KURT KLINKHAMMER
BY Robert Harding Jr.
ATTORNEY

United States Patent Office 2,705,743

Patented Apr. 5, 1955

2,705,743

ALL-RELAY SELECTOR WITH DOUBLE-FUNCTION RELAY CHAIN CIRCUIT ARRANGEMENT FOR RELAY SYSTEMS

Kurt Klinkhammer, Stuttgart-Zuffenhausen, Germany, assignor to International Standard Electric Corporation, New York, N. Y., a corporation of Delaware Application June 27, 1952, Serial No. 295,913

Claims priority, application Germany June 30, 1951

9 Claims. (Cl. 179—18)

This invention relates to automatic telephone switching systems and more especially it relates to automatic telephone systems employing selectors of the all-relay kind.

A principal object of the invention is to provide an improved form of line selecting system employing multi-contact relays for completing the connection, which relays are responsive to numerical or dial impulses in a step-by-step sequence.

Another object is to provide a group selector which is normally designed to be controlled by two sets of impulse responsive multi-contact relays for example a set of units relays and a set of tens relays, for extending an incoming line to any one of a series of outgoing lines; and wherein the set of units relays can be used to perform the double function of controlling the numerical trunk selection and also of a non-numerical or trunk hunting selection.

A feature of the invention relates to an automatic telephone switching system of the all-relay kind, employing a set of units-responsive multi-contact relays and a set of tens-responsive multi-contact relays, whereby the system can be used either for sequential units and tens selection; or if only one stage of numerical selection is required, for example units selection, the units and tens relays are mutually wired so that at the cessation of the units pulses they, the tens and units relays, cooperate to enable the units relays to act as trunk hunting relays.

Another feature relates to the novel organization and interconnection of parts which provide an improved all-relay group selector.

Other features will be apparent after a consideration of the following detailed descriptions and the appended claims.

In the single figure of the drawing, certain of the relays are of the plural winding type, for example there are shown a series of units responsive relays designated E1, E2 . . . E10. There may be ten such relays. For simplicity the various relays are identified by rectangles and capital letters, and their respective windings are identified by Roman numerals I, II, III within the respective rectangle. The relay contacts are identified by the corresponding lower-case letter and by a Roman numeral exponent identifying the number of the relay contact. Each of the relays E1 to E9 has three windings arranged in the usual way on a common core. However, the last relay of the unit series, namely relay E10, has only two windings. For simplicity and clarity in the drawing the windings for each given units relay are shown separated from each other. Similarly, there is provided a set of tens relays Z1 to Z10. Each of these relays has two windings on a common core, but the windings for each relay are shown separated in the drawing for purposes of clarity. Each of the tens relays is of the well known marginal type wherein for a given strength of current flowing through the relay winding, only certain contacts are operated. These contacts are designated in the drawing for each of the tens relays as $Z1^{vh}$, $Z2^{vh}$ . . . $Z10^{vh}$. On the other hand, when a current of increased amplitude passes through the relay winding all the remaining contacts of the energized relay are operated. Such relays are referred to herein as pre-stroke multi-contact relays. In the drawing, each set of pre-stroke contacts are designed by a bracket. Similarly, certain of the remaining function control relays, for example relay A, has three windings designated respectively by the Roman numerals I, II, III, it being understood that these windings are on a common core but are shown separated in the drawing for purposes of clarity. Likewise the control relay H has two windings which are shown separated in the drawing for purposes of clarity but are mounted on a common core. The relays V, VP and H are of the well known slow-to-release type.

In accordance with one feature of the present invention, the selective interconnection of an incoming line, for example line *a, b, c,* with a desired one of a number of outgoing lines similar to line $a_1$, $b_1$, $c_1$, is effected in response to the direct action of received dial pulses over the incoming line *a, b*. In the well known manner the conductor *c* of the incoming line and the conductor $c_1$ of the outgoing line constitute the test wires for testing the busy or idle condition of the lines. When the first set of dial pulses, for example the units pulses, are received they cause the selective operation of the corresponding one of the units relays E1–E10 and the operation of this relay prepares the completion of a circuit to one of a series of ten outgoing lines. After the cessation of the first set of dial pulses the circuit is switched over to bring into operation the tens relays Z1–Z10. The numerically operated units relay, for example relay E2, then causes the operation of the corresponding tens relay Z2, whereupon the said relay E2 releases. As a result of the release of the previously operated units relay, additional current is sent through the corresponding tens relay Z2 which operates all its remaining contacts. At this time all the units relays E1–E10 are connected in a test circuit to the corresponding test conductor $c_1$ of the ten trunks selected by the tens relay Z2. The advantage of this arrangement is that the numerical selection of an outgoing trunk can be accomplished by simple means, for example by a single set of units pulses directed to the units relays E1–E10, and the line contacts of the tens relays may even be deleted, or may be made available for other uses. In other words, the relays E1–E10 function during the first stage as a group selection arrangement to pick a particular group of outgoing trunks $a_1$, $b_1$, $c_1$, and thereafter the relays Z1–Z10 come into play to cause the unit relays E1–E10 to test the trunks in the selected group for an idle trunk before the incoming line is extended thereto. For simplicity in the drawing only three of the tens relays, namely relays Z1, Z2 and Z10 are shown.

When the group selector shown in the drawing has been seized, for example by a calling subscriber initiating a call or otherwise, the winding I of relay A is energized and the relay is operated from battery on the wire *c*, resistance *Wi*5, back contact $c^{I}$ of relay C, back contact $v^{I}$ of relay V, to ground through the winding I of relay A. At contact $a^{I}$ ground is extended through the winding of relay C which is connected to the test conductor *c*. Relay C operates and at its contact $c^{I}$ it switches the winding I of relay A to the signalling circuit connected to the source *Ans* or *Bes*. The source *Ans* may be of any well known kind for transmitting a distinctive proceed-to-dial signal. The source *Bes* may be any well known busy signal source.

Once relay A is operated it holds itself operated since its windings II and III are bridged directly across the calling subscribers loop. At contact $c^{III}$ ground is extended through the winding of slow-to-release relay VP, resistance *Wi*6 to battery. The arrow-head at the end of a wire represents the negative pole of a suitable common potential source, such as a battery, whose positive pole is grounded. Relay VP which is the pretesting or initial-test relay therefore operates. At its contacts $vp^{I}$ it connects the proceed-to-dial signal from source *Ans* in circuit whereby the proceed-to-dial signal is transmitted inductively back to the calling subscribers line, such signal being used instead of the customary dialling tone.

The calling subscriber then dials units impulses that correspond in number to the desired group trunk selection and the pulsing relay A follows these dial pulses, releasing itself once per pulse. At the first release of relay A it closes a circuit for slow-to-release relay V, traceable from ground through contacts $c^{II}$ of relay C, winding of relay V to battery through the contacts $a^{I}$ of relay A. Relay V remains energized throughout the succession of the units pulses. Contact $a^{III}$ of relay A thereupon closes a circuit for units relay E1 traceable from battery through resistance Wi1, contacts $vp^{IV}$ of relay VP, contacts $v^{III}$ of relay V, contacts $a^{III}$ of relay A, contacts $h^{IV}$ of relay H, winding I of relay E1 to ground through contacts $vp^{VII}$. Relay E1 thus operates and locks itself in a circuit traceable from ground through contacts $vp^{III}$, contacts $e1^{III}$, $e2^{III}$ . . . $e10^{III}$, contacts $v^{IV}$, contacts $vp^{V}$ to battery through the winding I of relay H. However, relay H does not respond at this time because the value of resistance Wi1, connected in parallel with it, is very low. As soon, however, as relay A reattracts its armature at the cessation of the first dialled units pulse, contact $a^{III}$ opens and removes parallel resistance Wi1 from shunt with winding I of relay H, relay H is energized in the aforesaid circuit and by means of its contacts $h^{IV}$ it prepares an operating circuit for the next units relay E2, while holding itself locked. This locking circuit is traceable from battery through resistance Wi2, contacts $h^{II}$ of relay H, contacts $c^{V}$ of relay C, to ground through the winding II of relay H.

When relay A responds to the second dialled impulse and again releases, its contacts $a^{III}$ return to normal and close an operating circuit for relay E2. This circuit is traceable from battery through resistance Wi1, contacts $vp^{IV}$ of relay VP, contacts $v^{III}$ of relay V, contacts $a^{III}$ of relay A, contacts $h^{IV}$ of relay H, contacts $e1^{IV}$, winding III of relay E1, winding I of relay E2, to ground through the contacts $vp^{VIII}$ of relay VP. Relay E2 operates in this circuit. In this same circuit relay E1 holds itself operated until relay A again operates, thus breaking at its contact $a^{III}$ the holding circuit through the winding III of relay E1. During that time, however, the units relay E2 remains operated in a circuit traceable from ground, contacts $vp^{VIII}$, winding I of relay E2, contacts $e2^{III}$ . . . contacts $e10^{III}$, contacts $v^{IV}$, contacts $vp^{V}$ to battery through the winding I of relay H.

It has been assumed that the subscriber has dialled the units digit 2. Consequently at the conclusion of the train of units impulses slow-to-release relay V releases since it is short circuited by contacts $a^{I}$. When relay V releases it closes a circuit for operating the corresponding tens relay Z2 over a circuit from ground through contacts $c^{IV}$ of relay C, contacts $v^{II}$ of relay V, contacts $e2^{I}$ of relay E2, winding I of relay Z2, contacts $z1^{vh}$ of relay Z1 . . . $z10^{vh}$ to battery. In this circuit the test relay Z2 responds in its preliminary or first stage and operates its prestroke contact $z2^{vh}$ only. Relay Z2 locks itself over a circuit traceable from ground, contacts $c^{IV}$, resistance Wi4, winding II of relay Z2, contacts $z2^{vh}$ . . . $z10^{vh}$, to battery through resistance Wi3.

With relay V deenergized, as above noted, at its contacts $v^{IV}$ it breaks the energizing circuit of relay H. Relay H, however, continues to hold itself operated over its winding II and over contacts $h^{II}$ and over contacts $c^{V}$. The contact $v^{IV}$ in opening also breaks the holding circuit of units relay E2 and furthermore short circuits the winding I of that relay E2. Upon the release of relay E2 an increased current is applied to the winding II of tens relay Z2 traceable as follows: ground through contacts $v^{IV}$, $e10^{III}$ . . . $e2^{III}$, $e1^{III}$, $h^{III}$, $vp^{III}$, winding II of relay Z2, contacts $z2^{vh}$ . . . $z10^{vh}$, resistance Wi3 to battery. Consequently, relay Z2 responds in its second stage so as to operate all its line contacts. At contact $z2^{III}$ of relay Z2 the pretesting relay VP is short circuited and this relay starts to release. However, before relay VP actually restores its contacts, all the units relays E1 . . . E10 are connected via contacts $z^{IV}$, $z^{V}$, $z^{VI}$, $z^{X}$ to the outgoing wires $c_1$ of the selected trunk group. The units relays by this connection thereupon serve as busy test relays for the respective trunks to which the test wires are connected. If for example the $c_1$ wire to which units relay E1 has been joined is not busy the following test circuit is closed, from ground, through contacts $vp^{VII}$, winding I and winding II of relay E1, contacts $z2^{IV}$, wire $c_1$, and thence to the succeeding stage. Since this particular trunk has been assumed to be not busy, battery is found on the said wire $c_1$ and relay E1 operates. Relay E1 renders this particular trunk busy to other seizures by short circuiting its high resistance winding I with the aid of its contact $e1^{III}$. This busying circuit is as follows: from ground, either through contacts $v^{IV}$ or $vp^{VI}$, contacts $e10^{III}$ . . . $e2^{III}$, $e1^{III}$, winding II of relay E1, contacts $z2^{IV}$, to wire $c_1$. Relay E1 in thus operating at its contacts $e1^{II}$ and $e1^{IV}$ extends the incoming talking conductors $a$, $b$ through contacts $z2^{I}$ and $z2^{II}$ to the outgoing talking conductors $a_1$, $b_1$.

If no such testing results occur, in the event that all the lines of the seized tens group are busy, winding II of relay H will be short circuited as a result of the release of relay VP. Consequently relay H will also be deenergized and will close its contact $h^{I}$, thus connecting the busy tone Bes through contacts $vp^{II}$, contacts $h^{I}$, contacts $c^{I}$ through winding I of relay A, thus inducing the same busy tone into the line conductors $a$, $b$ and back to the calling subscriber.

What is claimed is:

1. A group selector of the all-relay type for extending an incoming line to one of a plurality of outgoing lines arranged in groups, comprising in combination, a first set of relays arranged in a chain, one relay for each group of outgoing lines, means for applying impulses received from said incoming line to said first relay set to successively operate said relays in accordance with said received impulses, the last operated one of said relays adapted to store a record of the number of said received impulses, a second set of relays corresponding in number to said first relay set, means under control of said first relay set for operating a particular relay of said second set corresponding to the relay of said first set which stores said impulse record, means under control of an operated relay of said second set for selecting a particular group of said outgoing lines, means under control of said impulse applying means for causing the release of said operated relay of the first set, and means under control of the operated relay of said second set for causing said first relay set thereafter to seek an idle line in said selected group of outgoing lines.

2. A selector according to claim 1, wherein each of the relays of said first set comprise a plurality of operating windings and each of said outgoing lines comprises a test conductor, circuit means under control of an operated relay of said second set for respectively connecting an operating winding in each of the relays of said first set to a different one of said test conductors in said selected group of outgoing lines.

3. A selector according to claim 2, wherein each of the relays of said first set comprises a plurality of contact pairs, corresponding contact pairs of said relays arranged in a chain, one of said contact pairs arranged to shunt an operating winding associated with said relay when said relay becomes connected to an idle line in the selected group, thereby to open the chain.

4. A selector according to claim 1 in which each of said outgoing lines has a busy test conductor, and circuit connections under control of an operated relay of said second set for connecting all the test conductors of the selected group of outgoing lines simultaneously to respective operating windings of said first set of relays.

5. A selector according to claim 1 in which each relay of said second set is of the marginal kind having two sets of contacts, circuit connections for operating only one set of contacts in response to current of a certain amplitude and for operating all the contacts of the relay in response to current of a greater amplitude.

6. A selector according to claim 1 in which each relay of said second set is of the marginal kind wherein only one set of contacts is operated for a certain current applied to a relay of said second set under control of an operated relay of said first set and all the contacts are operated for a greater current, and circuit connections are provided and responsive to the said release of said previously operated relay in the first set to cause said greater current to be applied to said corresponding relay of the second set.

7. A selector according to claim 1 in which the relays of said first set have three windings, one winding being connected in a circuit energized in response to the received signalling pulses, a second winding being a locking winding in series with the operating winding of the next succeeding relay in said first set, and a third winding for series connection to a test conductor of an outgoing line for testing the busy condition thereof under control of a relay of said second set.

8. A selector according to claim 1 wherein said means for applying impulses to said first relay set comprises a slow-to-release control relay having circuit connections for maintaining it operated while signalling impulses are being received and for releasing it at the termination of such pulses, and other circuit connections between said control relay and said first set of relays for short circuiting the said previously operated relay in the first set at the termination of said pulses.

9. A selector according to claim 1 in which a slow-to-release control relay is provided and has circuit connections for maintaining it operated while said signalling numerical pulses are being received and for releasing it at the termination of such pulses, other circuit connections between said control relay and said first set of relays for short circuiting the said previously operated relay in the first set at the said termination of the pulses, and the relays of the second set each is of a type operated in two stages corresponding to currents of different amplitudes, and circuit connections responsive to the said release of said previously operated relay for operating all the contacts of the corresponding relay of the second set.

References Cited in the file of this patent

UNITED STATES PATENTS

| | | |
|---|---|---|
| 2,541,624 | Voss | Feb. 13, 1951 |
| 2,552,792 | Jones | May 15, 1951 |
| 2,574,944 | Voss | Nov. 13, 1951 |